Figure 1:
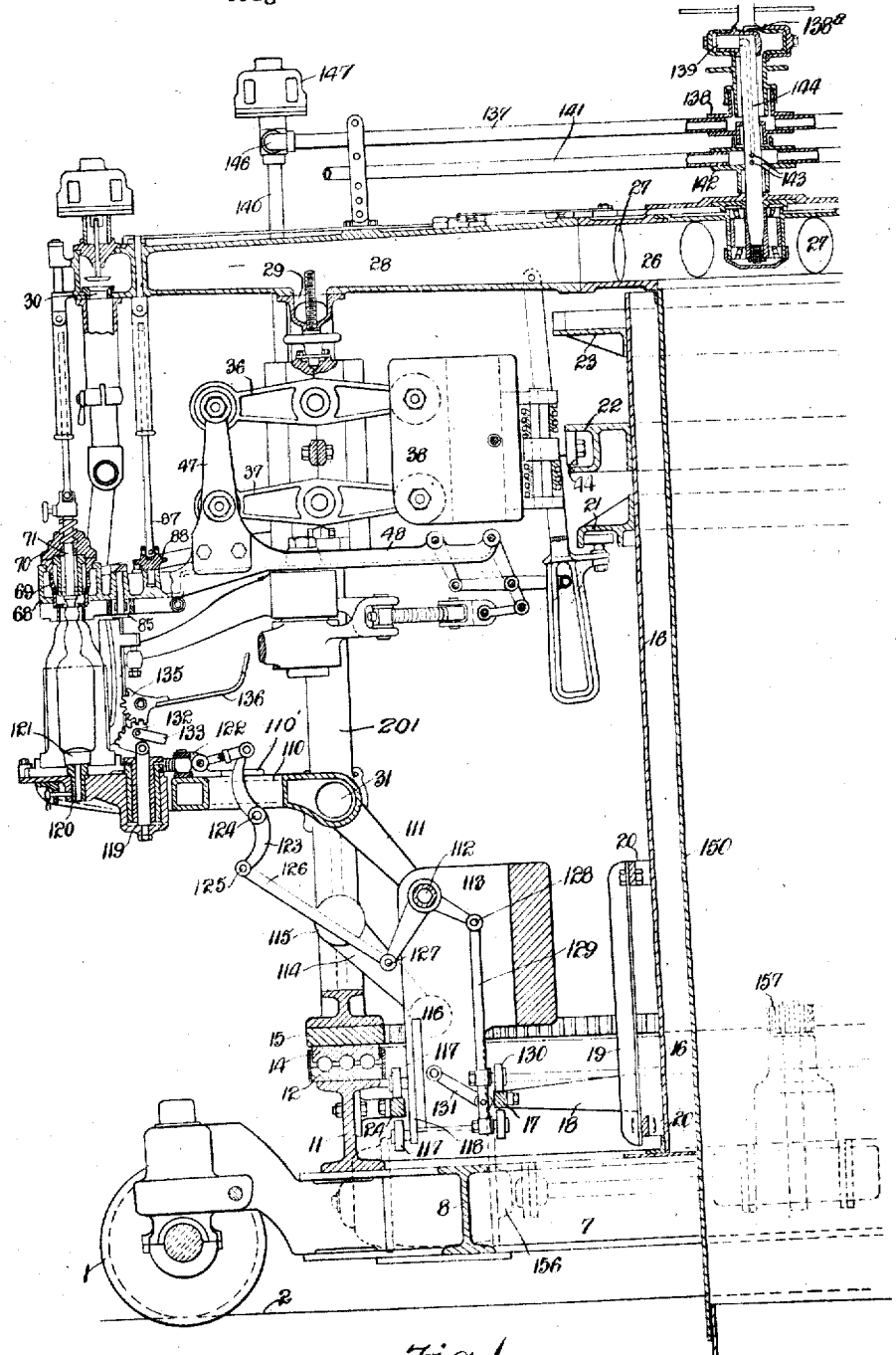
Figure 1A:
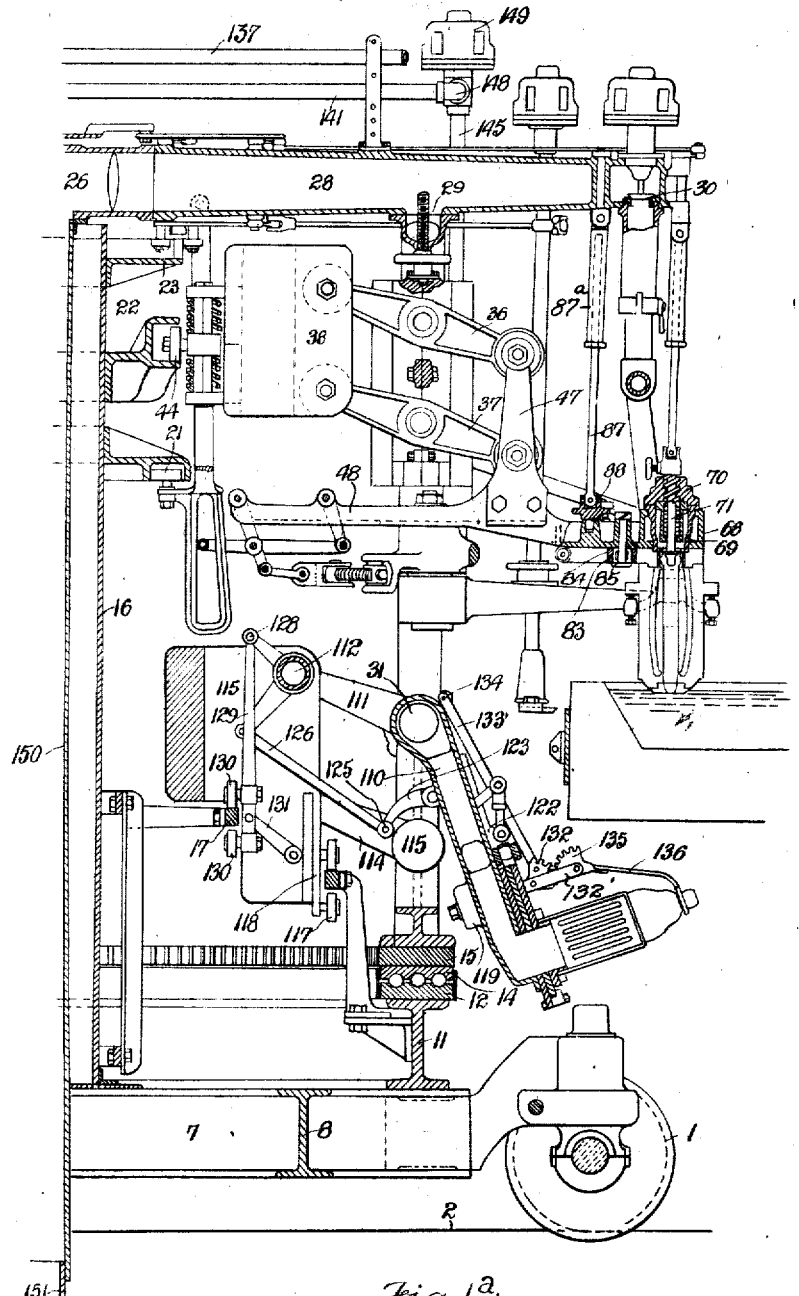

July 1, 1924.

R. F. HALL 1,499,525

MACHINE FOR THE MANUFACTURE OF GLASS ARTICLES

Original Filed March 13, 1918    4 Sheets-Sheet 1

July 1, 1924.
R. F. HALL
1,499,525
MACHINE FOR THE MANUFACTURE OF GLASS ARTICLES
Original Filed March 13, 1918    4 Sheets-Sheet 3
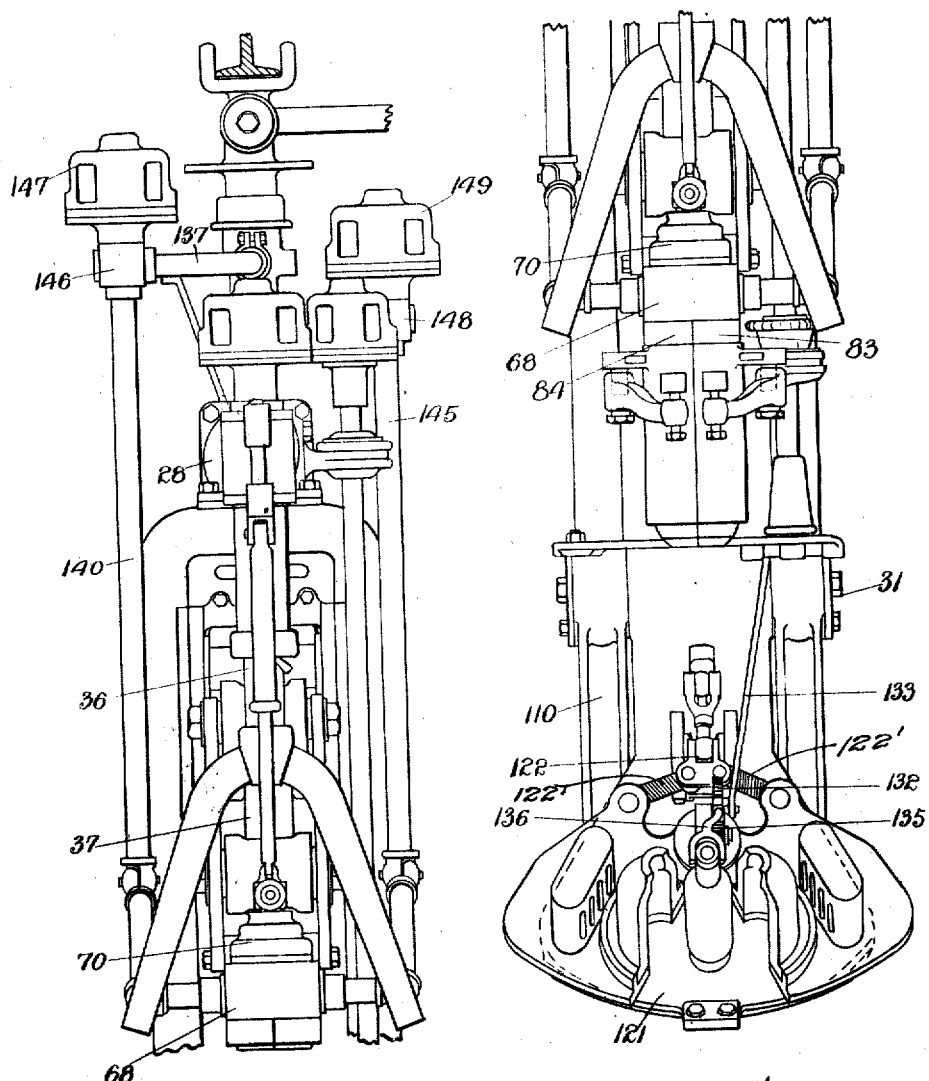

July 1, 1924.
R. F. HALL
1,499,525
MACHINE FOR THE MANUFACTURE OF GLASS ARTICLES
Original Filed March 13, 1918   4 Sheets-Sheet 4
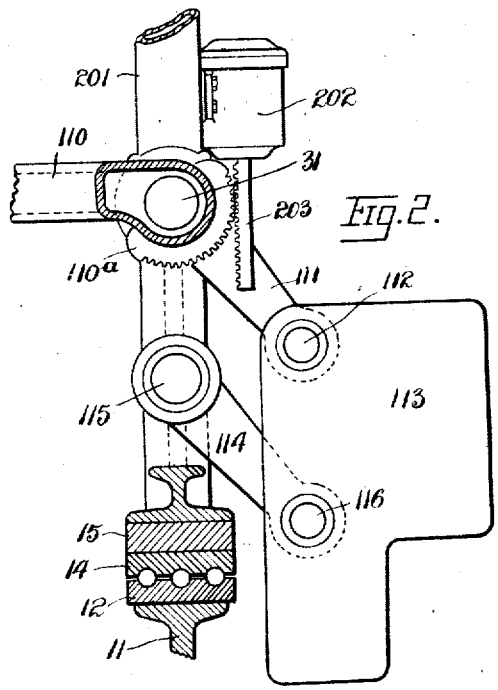
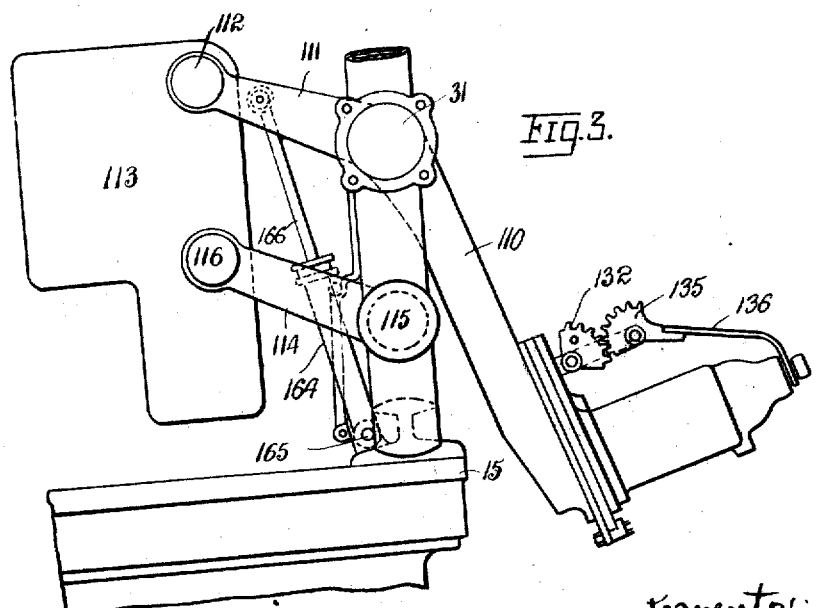

Patented July 1, 1924.

1,499,525

UNITED STATES PATENT OFFICE.

ROBERT FREDERICK HALL, OF MOSELEY, NEAR BIRMINGHAM, ENGLAND.

MACHINE FOR THE MANUFACTURE OF GLASS ARTICLES.

Original application filed March 13, 1918, Serial No. 222,257. Divided and this application filed July 27, 1920. Serial No. 399,430.

(GRANTED UNDER THE PROVISIONS OF THE ACT OF MARCH 3, 1921, 41 STAT. L., 1313.)

*To all whom it may concern:*

Be it known that I, ROBERT FREDERICK HALL, a subject of the King of Great Britain and Ireland, residing at Moseley, near Birmingham, in the county of Warwick, England, have invented certain new and useful Improvements in Machines for the Manufacture of Glass Articles (for which I have filed an application in Great Britain, filed July 10, 1917, No. 9922), of which the following is a specification.

This application is a division of my application for patent Serial No. 222,257, filed March 13, 1918.

This invention relates to rotary machines for the manufacture of glass articles, and refers to that type of such machines in which the molten glass from which the articles are to be formed is drawn by means of suction into a parison or other mould, the said mould being open at the bottom and being lowered to the surface of the molten glass, to enable the glass to be drawn into the interior thereof, after which the mould is raised and the parison therein contained is carried through the various operations for the production of the finished article.

In rotary machines of the foregoing type, it has already been proposed to mount, on a skeleton framework or spider, a series of parison moulds, the frame being reciprocated vertically during its revolution, to dip the lower edge of each parison mould into the molten glass.

It has also been proposed to provide a principal rotating framework or spider in which are mounted a number of frames each carrying a parison mould and its auxiliary parts, to provide means for adjusting the height of each frame above the glass tank and to counterbalance each frame and the auxiliary parts by means of a suitable weight, each such frame being lowered and raised vertically, while the machine continuously rotates, by a lever connected with it and co-operating with a horizontal cam disc.

As regards the finishing or blowing moulds, it has been proposed to mount these in connection with the main rotatable framework so that they are adapted to swing upwards, and to raise them at appropriate times, by means of rack and pinion gearing or by means of a cam roller attached beneath the swinging framework and running upon a suitable camway.

My present invention relates more particularly to the finishing moulds or equivalent devices, such for instance as pressing moulds, and their associated parts, and has for one of its objects to provide improved means for carrying, raising and lowering the said moulds and associated parts.

A further object of the invention is to provide improved means for opening and closing the moulds, so that such opening and closing can be readily effected irrespective of the position or movements of the swinging frames or the like carrying the moulds.

Other objects of the invention will also be referred to in the specification as regards minor constructional details and arrangements.

In the general way of carrying out my invention each finishing mould or its equivalent is carried by a straight or bent lever of the first order pivoted to the main framework of the machine or to a unit in connection therewith, and a link is provided parallel to that arm of the lever, which does not carry the mould, the said arm and link with the counterbalance weight and part of the main framework constituting a parallel link mechanism.

The opening and closing of the halves of the mould are operated by a lever or levers or the like independently of the movements or position of the said frame or member. This opening and closing may be effected by toggle mechanism operated by a lever pivoted to the swinging frame, the said lever being operated through suitable mechanism from a cam in connection with the fixed framework of the machine.

In order to hold the finished bottle or other article in position when the mould is open, I may provide a fork or the like adapted to engage around the neck of the bottle, or around some suitable part of the article, the said fork being so pivoted in connection with the swinging framework and so connected to the main fixed framework, that as the mould descends the fork or the like engages the article.

The fork may be operated by a toothed quadrant pivoted to the swinging framework, co-operating with a second toothed quadrant also pivoted to the said framework, a link being furnished connecting the second quadrant to the fixed framework or other part supporting the swinging member carrying the mould.

I prefer to mount the mechanism carrying the finishing mould or equivalent device and its associated parts, in an elongated loop or its equivalent adapted to be easily placed in position so as to form an integral portion of the main framework, and easily remove from such framework to facilitate the building and repair of the machine.

In order to facilitate the understanding of the invention a machine embodying its chief features and adapted for the manufacture of bottles will now be described by way of example with reference to the accompanying drawing:—

Fig. 1 is a sectional elevation of one half of the machine, the plane of section being broadly speaking diametrical with respect to the framework and the associated mechanisms.

Fig. 1ᵃ shows a similar section of the other half of the machine on the same diameter as Fig. 1.

Figs. 1ᴷ and 1ᴸ are segmental views which taken together constitute an outside elevation of the mechanism supporting the finishing mould.

Fig. 2 is a diagrammatic view illustrating one method of raising and lowering the finishing mould by an electric solenoid, whilst, Fig. 3 is a similar view illustrating the raising and lowering of the finishing mould by a pneumatic plunger.

The same numerals are employed to denote the same parts in all the views.

In the following description the details of the machine which are not immediately connected with the present invention are briefly considered, in order to enable the general construction and working of the machine to be understood, but they will be found described in greater detail in my co-pending application Serial No. 399,427, filed July 27, 1920.

The machine is supported upon wheels 1 adapted to run upon rails 2 in the neighbourhood of the furnace in the ordinary manner.

These wheels support the main lower framework of the machine, which is composed of longitudinally disposed girders 7 connected by transverse girders 8.

The girder framework, 7, 8 carries a ring 11, which in turn carries a channeled ring 12, forming the lower member of a ball bearing. 14 is another ring forming the upper member of the ball bearing and to this latter ring is attached an internally toothed annulus 15.

Suitably supported upon the lower girder framework 7, 8 is a vertical column 16, carrying the principal non-rotatable parts of the machine.

These parts comprise:—A large cam 17, carried by brackets 18, connected in turn to vertical struts 19, carried by brackets 20 upon the column 16, another cam, in this case a horizontal cam, 21 at a higher level, a vertical cam 22 at a still higher level, and a horizontal cam 23, near the top of the column.

24 is another cam carried by suitable brackets on the fixed framework of the machine.

At the top of the machine is a chamber 26 provided on the outside with a number of projecting faces each having a circular aperture 27 formed therein.

Bolted to each of the faces opposite one of the apertures 27 is a hollow arm 28 which extends radially from the said chamber. Each radial arm is closed at the end but provided with apertures 29 and 30 for the purposes hereinafter explained.

Bolted between each one of the radial arms 28 and the annulus 15 is a column or framework 201, hereinafter termed "the bifurcated column" and it will be seen that when all the bifurcated columns are in positions they carry the chamber 26 through the intervention of the radial arms 28 and that the whole rotatable superstructure of the machine is carried by the bearing ring 14.

The columns are formed from castings of H section at the lower part and solid up to the height of the trunnions 31, from which position to the top they are hollow, so that when each unit or bifurcated column is in position, the interior of the side frames of the column is in communication through the corresponding arm 28 and aperture 27 with the interior of the chamber 26.

The upper part of the bifurcated column carries the parison mould and its associated mechanisms which need not be described in detail as they form the subject of a co-pending application Serial No. 399,429, filed July 27, 1920.

In the form illustrated in the drawing the mechanism for carrying each parison mould comprises two parallel levers 36 and 37 connected at their inner ends to the weight 38, the movement of which is controlled by a roller 44, working in the cam 22, the parison mould sections being carried by a casting 48, from a link 47 to which the outer ends of the levers 36 and 37 are pivoted.

The casting 48 also carries or is formed with a chamber 68, which constitutes the casing of the blowing head and to which the inlet nozzle for compressed air and the suction nozzle are attached as hereafter explained.

Within the casing or chamber 68 is a bushing 69, perforations being provided to allow compression or suction to take place through the walls of this bushing. Mounted at the top of the part 69 is a cap 70, through which the plunger 71 for making the initial blow opening is operated.

Mounted below the blowing head and carried by the casting 48 is the ring mould which consists of two parts 83 and 84 pivoted at 85 to the lower face of the casting 48, and controlled from the rod 88.

The constructional details in connection with the lower portion of each of the bifurcated columns, and relating more particularly to the finishing mould will now be considered in detail.

Each of these columns is formed at 31, with bearings in which work the trunnions of the frame or device carrying the finishing mould and its associated parts.

This consists of a casting 110 formed with suitable passages for air in connection through the trunnions and the bearings 31, at the proper time, with the hollow passages in the sides of the bifurcated columns. This casting is formed with an extension 111, in such a way that the parts 110 and 111 form a bent lever. The part 111 is pivoted at 112 to a weight 113. 114 is a link pivoted at 115, to a lower bearing in connection with the bifurcated column and at 116 to the weight.

It will thus be seen that the part 110 constitutes a swinging table controlled by a parallel link motion from the weight 113.

The weight 113 is itself controlled from the double acting cam ring 24 through rollers 117, which are attached to a rod 118, connected through spring buffering means to the weight 113.

Mounted upon the swinging table 110 is a plate 110' provided with suitable slots for the passage of air. 119 is a socket in which the bearing for the two halves of the finishing mould carrier 51 is located.

120 is a socket for the reception of the stem of the bottom mould 121.

The opening and closing of the finishing moulds, which are of ordinary description, is effected in the following manner.

Each of the arms carrying the half of the finishing mould is extended backwards beyond the bearing and the ends of the arms are connected to linking rods which are in turn connected to a slide block 122, a helical compression spring 122' surrounding each of the rods. The block is connected to an S shaped lever 123 pivoted at 124 to the swinging member 110. The S shaped lever 123 is connected at 125 to a link 126 which is pivoted at 127 to one arm of a bell crank lever working freely upon the pivot 112.

The other arm of this bell crank lever is pivoted at 128 to a vertical rod 129 carrying rollers 130 working in connection with the double acting cam 18. 131 is another link pivoted to the rod 129 in order to steady the action and convert it into a parallel link motion the other pivotal point of the link 131 being on the weight 113, as will be clearly seen from the drawing.

132 is a toothed quadrant pivoted to an arm 132' above the swinging table 110. This toothed quadrant is connected by means of a rod 133 with a fixed pivotal point 134 on column 201. 135 is another toothed quadrant carrying a forked arm 136 for the purpose of engaging the neck of the bottle as hereafter explained.

The arrangements in connection with the top of the machine where the distributing systems for compressed air and suction are located will now be briefly considered.

137 are radial pipes communicating with sockets in sleeves 138 mounted on a housing rotating in communication with a fixed air tight housing 138ª, to the interior of which blowing air is supplied through the conduit 139. The pipes 137 communicate with vertical pipes 140 which pass down to the bifurcated columns one pipe for each column, the pipe being carried out through suitable joints to the nozzle or connection at the side of the blowing head 68. 141 are other radial pipes communicating with sockets 142 in a rotatable member which is in connection through perforations 143 in the tube 144 with the suction pump. The tubes 141 are connected to vertical tubes 145 which in turn are connected one for each bifurcated column through suitable jointed connections with another nozzle on the suction head 68. At the junction of the pipes 137 and 140 are provided valve chambers 146 containing valves operated by solenoids 147 and in a similar way valves are provided in connection with the valve chambers 148 at the junction of the pipes 141 and 145, the valves being controlled by means of solenoids 149.

150 is a large vertical tube hanging from the chamber 26 and passing down through the central column to the bottom of the machine. Telescopically arranged with respect to the tube 150 is another tube 151, in connection with the source of supply of cooling air. In the preferred construction the fan or blower is carried from a cradle or the like hanging from the bottom of the machine, the means of suspension extending down between the rails upon which the machine is carried.

The driving mechanism for effecting the continuous rotation of the machine consists of an electric motor 156, connected by any usual system of shafting and gearing with a pinion 157 which meshes with the internally toothed annulus 15, upon which the rotatable portions of the machine are carried.

Appropriate contact making means are provided in connection with a source of electrical energy for supplying current at the proper times to the various solenoids operating the valve and other electrically operated parts.

The general operation of the machine will now be briefly considered.

In the first place the appropriate parison moulds are adjusted in position and also the corresponding finishing moulds and the machine is started.

At the right of Fig. 1ª, one of the parison molds has just been lowered owing to the levers 36 and 37 being rocked over through the medium of the vertical cam 22.

The suction valve is opened by means of the solenoid 149, which causes suction to be produced through the head 68 and around the plug 71, drawing up the molten glass from the tank into the parison mould.

As soon as the necessary amount of glass has been drawn into the parison mould, the mould is raised through the operation of the cam 22.

As the unit passes away the depending glass is cut off by the knife and then the plunger 71 is moved up through the operation of its controlling rod. The knife and its operation are more fully described in my co-pending application Serial No. 399,431, filed July 27, 1920.

The parison mould has now risen to its upper position and is open, and the parison is ready to be enclosed by the finishing mould.

The raising of the finishing mould is effected by the weight 113, which is preferably heavier than the parts which it has to counterbalance, so that when the cam 24 permits of the descent of the weight, the halves of the finishing mould rise into position.

When the halves of the mould are in the closed position they are kept in their position by the springs before referred to in connection with the toggle mechanism.

The finishing mould being closed, the bottle is blown, the valve for the blowing air being opened by the solenoid 147, which is energized at the proper time for that purpose.

When the blowing is finished and the valve is closed, the ring mould is opened by the operating rod 87 operated through telescoping member 87ª and connected parts not here described.

The cam 24 now overcomes the counterbalance weight 113, which has previously been causing the finishing mould to retain its correct position in relation to the lower surface of the ring mould. The weight 113, rises and the finishing mould descends into the position shown on the right hand side of the Fig. 1 as regards its vertical height, but it is to be remembered that this descent actually takes place at some suitable position on the other side of the machine.

It is to be observed that cooling air is passing from the arm 28 down the outside of the bifurcated column, through the hollow trunnions 31 and the hollow casting 110, so that cooling air is blown around the finishing mould.

The casting 110 travels round with the halves of the mould closed together, and in the case of the machine under consideration, they remain closed together until the unit has passed the glass tank and a new parison has been drawn into the corresponding parison mould.

When the mould moved into the lower position, this caused the rod 133, to pull upon the pivoted quadrant 132, which in turn rocked over the quadrant 135, and caused the fork 136 to engage around the neck of the bottle, as seen on the right hand side of Fig. 1.

Just before or just as the mould is to be again raised, the cam 18, acting through the rollers 17, causes the bell crank lever mechanism 113, 114 and the levers 126, 125, etc., to cause the toggle mechanism to open the halves of the mould.

The fork 136 prevents the bottle from sticking to either half of the mould, and the bottle drops away into the usual chute as the finishing mould rises to enclose a fresh parison.

The cycle of operations is carried on continuously in the same manner as just described.

The method of mounting and operating the finishing moulds just described possesses important advantages.

Where the rise of the mould is brought about solely by means of a cam as is usually the case with rotary machines for the manufacture of bottles, there is considerable friction and a large amount of work has to be expended in order to effect the raising, and in any case the use of steep cams to effect a raising operation is to be deprecated.

The counterbalance weight, which it is to be remembered tends normally to keep the blowing mould pressed securely in the correct position causes very little work to be expended in the operation of the raising of the mould since the cam rollers in connection with the weight simply run down a steep slope on the cam; on the other hand the slope which raises the weight and depresses the mould may be of comparatively moderate gradient.

The method of mounting the finishing mould in the bifurcated column is also very advantageous, as it enables the mould and associated mechanisms to be removed as a whole and to be placed in position with great facility.

In some cases the raising and lowering of the finishing mould may be effected by electrical means or by means of a fluid pressure motor, working alone or in combination with suitable cams.

Referring to Fig. 2, which shows one method of raising and lowering the finishing mould by electrical means 110ᵃ, is a toothed segment integral with the frame 110, carrying the finishing mould and its associated parts, 202 is the coil of a solenoid carried by a bracket attached to the bifurcated column 201, 203 is a rack forming an extension of the core of the solenoid, which rack meshes with the toothed segment 110ᵃ. When the coil is energized, the core is drawn in, causing the rack 203 to move vertically upwards, turning the segment 110ᵃ in a counter clockwise direction, raising the weight 113, and lowering the finishing mould.

One method of raising and lowering the counterbalance weight of the finishing mould by means of a pneumatic plunger is shown at Fig. 3 in which 164 is the cylinder of the pneumatic operating device, which is pivoted at 165 to a fixed portion of the rotating framework. The piston rod 166 is pivoted as shown to the link 111.

It will be evident that when the fluid pressure raises the piston in the cylinder 164, this causes the part 111 to be raised thus raising the counterbalance weight 113.

As a general rule I find it most desirable to use cams in conjunction with a counterbalance weight for raising and lowering the finishing moulds, and cams for operating the opening and closing of the finishing moulds.

It will be understood that the particular details of construction may be varied without departing from the principle of my invention.

I claim:

1. In a machine of the class described for forming glass articles, a stationary frame, a rotatable frame carried thereby, a finishing mold carrying member pivoted in the rotatable frame, a finishing mold thereon, air ducts in said finishing mold carrying member, means for supplying air thereto, means for directing cooling air from said ducts against the finishing mold, means for operating the finishing mold carrying member, and means for operating the finishing mold.

2. In a machine for the manufacture of glass articles, the combination of a rotatable framework, a bent lever of the first order pivoted to the said framework, a finishing mold carried by the outer arm of the said lever, a link pivoted to the inner arm of the said lever, another link pivoted to the first mentioned link, parallel to the inner arm of the lever and pivoted to the framework, so as to constitute a parallel link lever mechanism, and means for raising and lowering said parallel link lever mechanism at appropriate times, for the purposes set forth.

3. In a machine for the manufacture of glass articles, the combination of a rotatable framework, a bent lever of the first order pivoted to the said framework, a finishing mold carried by the outer arm of the said lever, a counterbalance weight constituting a link pivoted to the inner arm of the said lever, another link pivoted to the first mentioned link, parallel to the inner arm of the lever and pivoted to the framework so as to constitute a parallel link lever mechanism, and means for raising and lowering said parallel link lever mechanism at appropriate times, for the purposes set forth.

4. In a machine for the manufacture of glass articles, the combination of a rotatable framework, mounted upon a fixed base, a lever of the first order pivoted to the said framework, a finishing mold carried by the outer arm of the said lever, a link pivoted to the inner arm of the said lever, another link pivoted to the first mentioned link, parallel to the inner arm of the lever and pivoted to the framework so as to constitute a parallel link lever mechanism, a cam in rigid connection with the fixed base, and a cam follower to said cam, such follower being connected to the inner link for the purposes set forth.

5. In a machine for the manufacture of glass articles, the combination of a rotatable framework, mounted upon a fixed base, a bent lever of the first order pivoted to the said framework, a finishing mold carried by the outer arm of the said lever, a link pivoted to the inner arm of the said lever, another link pivoted to the first mentioned link, parallel to the inner arm of the lever and pivoted to the framework so as to constitute a parallel link lever mechanism, a cam in rigid connection with the fixed base, and a cam follower to said cam, such follower connected to the inner link, for the purposes set forth.

6. In a machine for the manufacture of glass articles, the combination of a rotatable framework mounted upon a fixed base, a bent lever of the first order pivoted to the said framework, a finishing mold carried by the outer arm of the said lever, a counterbalance weight constituting a link pivoted to the inner arm of the said lever, another link pivoted to the first mentioned link, parallel to the inner arm of the lever and pivoted to the framework so as to constitute a parallel link lever mechanism, a cam in rigid connection with the fixed base, and a cam follower to said cam, such follower being connected to the inner link, for the purposes set forth.

7. In a machine for the manufacture of glass articles, the combination of a rotatable framework mounted upon a fixed base, a bent lever of the first order pivoted to the said framework, a sectional finishing mold carried by the outer arm of the said lever, a counterbalance weight constituting a link pivoted to the inner arm of the said lever, another link pivoted to the first mentioned link, parallel to the inner arm of the lever and pivoted to the framework, so as to constitute a parallel link lever mechanism, a cam in rigid connection with the fixed base, a cam follower to said cam, such follower being connected to the counterbalance weight constituting the inner link, and means for opening and closing the sections of the parison mold at appropriate times, for the purposes set forth.

8. In a machine for the manufacture of glass articles, the combination of a rotatable framework mounted upon a fixed base, a bent lever of the first order pivoted to the said framework, a sectional finishing mold carried by the outer arm of the said lever, a counterbalance weight constituting a link pivoted to the inner arm of the said lever, another link pivoted to the first mentioned link parallel to the inner arm of the said lever and pivoted to the framework, so as to constitute a parallel link lever mechanism, means for raising and lowering said parallel link lever mechanism at appropriate times, and means for opening and closing the sections of the finishing mold, such last mentioned means comprising pivoted arms carrying the sections of the mold, toggle mechanism operating the said arm, a cam mounted in fixed relation to the base of the machine, and a follower to said cam, said follower operating the before mentioned toggle mechanism for the purposes set forth.

9. In a machine for the manufacture of glass articles, the combination of a rotatable framework mounted upon a fixed base, a bent lever of the first order pivoted to the said framework, a sectional finishing mold carried by the outer arm of the said lever, a counterbalance weight constituting a link pivoted to the inner arm of the said lever, another link pivoted to the first mentioned link parallel to the inner arm of the said lever and pivoted to the framework, so as to constitute a parallel link lever mechanism, a cam in rigid connection with the fixed base, a cam follower to said cam, such follower being connected to the counterbalance weight constituting the inner link, and means for opening and closing the sections of the finishing mold, such last mentioned means comprising pivoted arms carrying the sections of the mold, toggle mechanism operating the said arms, a cam mounted in fixed relation to the base of the machine, and a follower to said cam, said follower operating the before mentioned toggle mechanism for the purposes set forth.

10. In a machine for the manufacture of glass articles, the combination of a rotatable framework, a lever of the first order pivoted to the said framework, a sectional finishing mold carried by the outer arm of the said lever, a link pivoted to the inner arm of the said lever, another link pivoted to the first mentioned link, parallel to the inner rod of the lever and pivoted to the framework so as to constitute a parallel link lever mechanism, a pivoted fork pivoted to the outer arm of the lever in proximity to the finishing mold, and means for causing the fork to engage round the top of the article being finished as the sections of the mold open, for the purposes set forth.

11. In a machine for the manufacture of glass articles, the combination of a rotatable framework, a lever of the first order pivoted to the said framework, a sectional finishing mold carried by the outer arm of the said lever, a link pivoted to the inner arm of the said lever, another link pivoted to the first mentioned link, parallel to the inner arm of the lever and pivoted to the framework so as to constitute a parallel link lever mechanism, means for raising and lowering the lever at appropriate times, a toothed quadrant pivoted to the outer arm of the lever in proximity to the finishing mold, said toothed quadrant carrying a fork adapted when swung over to embrace the top of the article being finished, another toothed quadrant meshing with the first mentioned quadrant and also pivoted on the outer arm of the lever, and a rod connecting the latter quadrant to a portion of the framework in such a way that as the finishing mold opens, the said fork engages the top of the article, substantially as described.

12. In a machine for forming glass articles of the class described, a finishing mold, parallel levers for raising and lowering the finishing mold, a weight on one of the levers for counterbalancing the finishing mold, and means for rocking the levers.

13. In a machine of the class described for forming glass articles, which machine includes a frame member, a lever of the first order pivoted in the frame member, a finishing mold and its associated parts on said lever at one side of the pivot, a weight in said lever at the other side of the pivot to counterbalance the finishing mold, a second lever parallel with a portion of the first lever and pivoted to said frame and to the weight to provide a parallel link motion for the weight, and means for rocking the weight to effect a movement of said levers.

14. In a machine for forming glass articles of the class described, a finishing mold carrying frame, means for swinging the finishing mold carrying frame in an arc, finishing mold sections carried thereby, and means for moving said finishing mold sections toward and from each other, said means including a parallel link mechanism, and means for effecting the movement of said link mechanism when the finishing mold carrying frame is in proper position.

15. In a machine of the class described for forming glass articles, which machine includes a frame member, a lever of the first order pivoted in said frame member, a finishing mold comprising movable sections and its associated parts on said lever at one side of the pivot, a weight on said lever at the other side of the pivot to counterbalance the finishing mold, means for rocking said lever, and means for effecting the movement of said mold sections, comprising a parallel link mechanism connected therewith and carried on said pivoted lever and weight, and means for effecting the actuation of said parallel link mechanism independently of the movement of said lever.

16. In a machine for forming glass articles of the class described, a finishing mold carrying frame, means for swinging the finishing mold carrying frame in an arc, finishing mold sections carried thereby, and means for moving said finishing mold sections toward and from each other, said means including toggle levers connected with the mold sections, a parallel link mechanism mounted on the swinging frame, and connected with the toggle levers, and means for operating the parallel link mechanism.

In testimony whereof, I have hereunto subscribed my name.

ROBERT FREDERICK HALL.